(12) United States Patent
Chen et al.

(10) Patent No.: US 11,693,301 B2
(45) Date of Patent: Jul. 4, 2023

(54) ILLUMINATION SYSTEM AND PROJECTION APPARATUS

(71) Applicant: Coretronic Corporation, Hsin-Chu (TW)

(72) Inventors: Yu-Shan Chen, Hsin-Chu (TW); Wan-Ting Hsieh, Hsin-Chu (TW); Ming-Tsung Weng, Hsin-Chu (TW); Chi-Tang Hsieh, Hsin-Chu (TW); Haw-Woei Pan, Hsin-Chu (TW); Jo-Han Hsu, Hsin-Chu (TW); Kuan-Ta Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 46 days.

(21) Appl. No.: 17/535,708

(22) Filed: Nov. 26, 2021

(65) Prior Publication Data
US 2022/0206371 A1    Jun. 30, 2022

(30) Foreign Application Priority Data

Dec. 25, 2020  (CN) .......................... 202011561594.5

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2066* (2013.01)

(58) Field of Classification Search
CPC .............. G03B 21/204; G03B 21/2066; G03B 21/2033; G03B 21/2073; G03B 21/206; G03B 21/208; G02B 26/008; G02B 27/18; G02B 27/1006
See application file for complete search history.

(56) References Cited

U.S. PATENT DOCUMENTS

| 2014/0240676 | A1  | 8/2014 | Maes et al. |
| 2015/0241764 | A1* | 8/2015 | Hung ................. G03B 21/2053 353/121 |
| 2020/0089091 | A1* | 3/2020 | Jao ..................... G03B 21/2013 |
| 2020/0201153 | A1* | 6/2020 | Liu ..................... G03B 21/204 |

* cited by examiner

*Primary Examiner* — Magda Cruz
(74) *Attorney, Agent, or Firm* — JCIPRNET

(57) ABSTRACT

An illumination system, including a light source module, a phosphor wheel, a light recycling element, and a light uniformizing element, is provided. The light source module emits an excitation light beam. The phosphor wheel includes a phosphor region. At a second timing, the other part of the excitation light beam transmitted to the phosphor region forms an unconverted light beam and is transmitted to the light recycling element, and is reflected by the light recycling element to form a recycled light beam. A part of the recycled light beam is converted into a second converted light beam. A first converted light beam and the second converted light beam are transmitted to the light uniformizing element through a same path, so that the illumination system outputs second light in the illumination light beam. A projection apparatus is also provided.

20 Claims, 11 Drawing Sheets

ILLUMINATION SYSTEM AND PROJECTION APPARATUS

CROSS-REFERENCE TO RELATED APPLICATION

This application claims the priority benefit of China application serial no. 202011561594.5, filed on Dec. 25, 2020. The entirety of the above-mentioned patent application is hereby incorporated by reference herein and made a part of this specification.

BACKGROUND

Technical Field

The invention relates to an optical system and an optical device, and particularly relates to an illumination system and a projection apparatus.

Description of Related Art

Generally, a projection apparatus mainly includes an illumination system, a light valve, and a projection lens. The illumination system outputs light of different wavelengths at different timings, and controls a color gray scale of each pixel of an image through the light valve, and then projects the image through the projection lens. The illumination system mainly uses a phosphor wheel to output the light of different wavelengths. However, even if a problem of poor light energy conversion efficiency caused by poor heat dissipation of the phosphor wheel is resolved, the phosphor wheel itself has the problem of poor light energy conversion efficiency of phosphor. A part of the light energy is not fully converted and utilized, so that the projection apparatus has a serious problem of waste of light energy.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an illumination system and a projection apparatus, which effectively resolve the problem of waste of light energy.

An embodiment of the invention provides an illumination system configured to provide an illumination light beam. The illumination system includes a light source module, a phosphor wheel, a light recycling element, and a light uniformizing element. The light source module is configured to emit an excitation light beam. The phosphor wheel includes a phosphor region. At a first timing, the excitation light beam is transmitted to the light uniformizing element, so that the illumination system outputs first light in the illumination light beam. At a second timing, the excitation light beam is transmitted to the phosphor region of the phosphor wheel, so that a part of the excitation light beam transmitted to the phosphor region is converted into a first converted light beam, and the other part of the excitation light beam transmitted to the phosphor region forms an unconverted light beam and is transmitted to the light recycling element, and is reflected by the light recycling element to form a recycled light beam. The recycled light beam is transmitted to the phosphor region of the phosphor wheel, and a part of the recycled light beam is converted into a second converted light beam. The first converted light beam and the second converted light beam are transmitted to the light uniformizing element through a same path, so that the illumination system outputs second light in the illumination light beam. At the second timing, reflectivity of the light recycling element to a waveband of the unconverted light beam is greater than 90%.

An embodiment of the invention provides a projection apparatus. The projection apparatus includes an illumination system, a light valve, and a projection lens. The illumination system is configured to provide an illumination light beam. The light valve is disposed on a transmission path of the illumination light beam to convert the illumination light beam into an image light beam. The projection lens is disposed on a transmission path of the image light beam to project the image light beam out of the projection apparatus. The illumination system includes a light source module, a phosphor wheel, a light recycling element, and a light uniformizing element. The light source module is configured to emit an excitation light beam. The phosphor wheel includes a phosphor region. At a first timing, the excitation light beam is transmitted to the light uniformizing element, so that the illumination system outputs first light in the illumination light beam. At a second timing, the excitation light beam is transmitted to the phosphor region of the phosphor wheel, so that a part of the excitation light beam transmitted to the phosphor region is converted into a first converted light beam, and the other part of the excitation light beam transmitted to the phosphor region forms an unconverted light beam and is transmitted to the light recycling element, and is reflected by the light recycling element to form a recycled light beam. The recycled light beam is transmitted to the phosphor region of the phosphor wheel, and a part of the recycled light beam is converted into a second converted light beam. The first converted light beam and the second converted light beam are transmitted to the light uniformizing element through a same path, so that the illumination system outputs second light in the illumination light beam. At the second timing, reflectivity of the light recycling element to a waveband of the unconverted light beam is greater than 90%.

Based on the above description, in the illumination system and the projection apparatus of an embodiment of the invention, since the illumination system and the projection apparatus are provided with the light recycling element, a light energy utilization rate of the illumination system and the projection apparatus is effectively improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
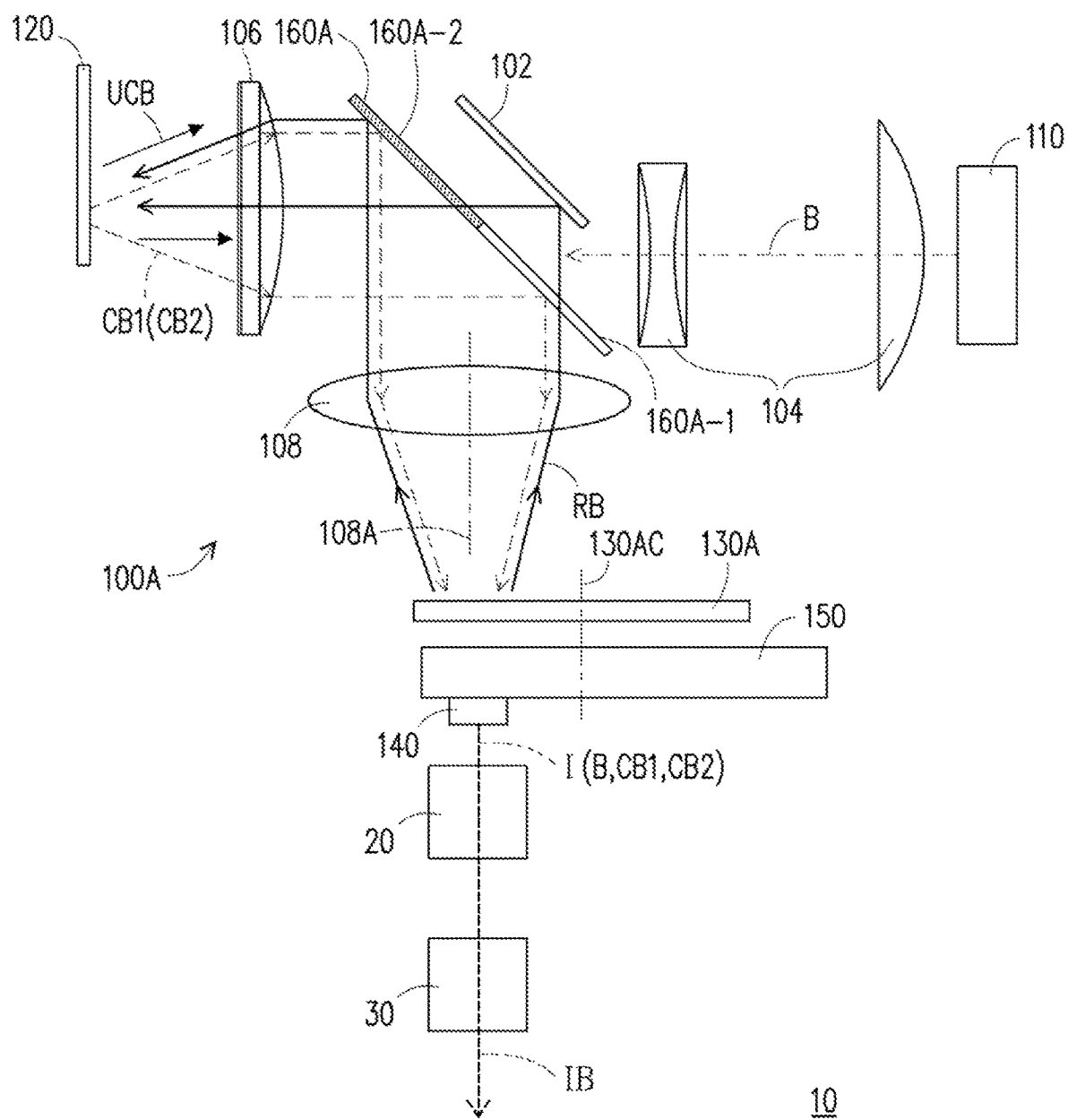
FIG. 1A is a schematic diagram of a projection apparatus according to an embodiment of the invention.

FIG. 1A is a schematic diagram of a projection apparatus according to an embodiment of the invention. Referring to FIG. 1A, a projection apparatus 10 according to the embodiment of the invention includes an illumination system 100A, a light valve 20 and a projection lens 30. The illumination system 100A is configured to provide an illumination light beam I. The light valve 20 is disposed on a transmission path of the illumination light beam I, and is configured to convert the illumination light beam I into an image light beam IB. The projection lens 30 is disposed on a transmission path of the image light beam IB, and is configured to project the image light beam IB out of the projection apparatus 10.

In detail, the light valve 20 of the embodiment is, for example, a spatial light modulator such as a digital micromirror device (DMD), a liquid-crystal-on-silicon panel (LCOS panel), or a liquid crystal panel (LCD), etc., and is not particularly limited to a transmissive or reflective spatial light modulator by the invention. In addition, the projection lens 30 is, for example, a combination of one or a plurality of optical lenses with refracting powers. The optical lens, for example, include a non-planar lens such as a biconcave lens, a biconvex lens, a concavo-convex lens, a convexo-concave lens, a plano-convex lens, a plano-concave lens, etc, or various combinations thereof. The pattern and type of the projection lens 30 are not limited by the invention.

In the embodiment, the illumination system 100A includes a light source module 110, a phosphor wheel 120, a light recycling element 130A, and a light uniformizing element 140, and may selectively include a light guide element 160A and a reflective element 102 for guiding transmission of light beams. The light source module 110 is configured to emit an excitation light beam B. The light source module 110 is, for example, a laser diode (LD), a light-emitting diode (LED) or other suitable light sources or a combination thereof, which is not limited by the invention. Moreover, the excitation light beam B may be light with a blue, red, green or other light colors. The light uniformizing element 140 is, for example, an integration rod, a lens array, or other optical elements with a light uniformizing effect, but the invention is not limited thereto.

In the embodiment, the light recycling element 130A is perpendicular to the phosphor wheel 120, for example, a light incident surface of the light recycling element 130A is perpendicular to a light incident surface of the phosphor wheel 120.

In the embodiment, the excitation light beam B emitted by the light source module 110 is sequentially transmitted to the light guide element 160A and the phosphor wheel 120, and the reflective element 102 and the light uniformizing element 140 are disposed on two sides of the light guide element 160A. Furthermore, at a certain timing period, the excitation light beam B emitted by the light source module 110 is sequentially transmitted to the light guide element 160A, the phosphor wheel 120, the light guide element 160A, the light recycling element 130A, and the light uniformizing element 140. For example, the light guide element 160A is disposed between the light source module 110 and the phosphor wheel 120, and between the reflective element 102 and the light uniformizing element 140, where a reflective surface of the light guide element 160A and a reflective surface of the reflective element 102 are, for example, parallel. The light recycling element 130A is disposed between the light guide element 160A and the light uniformizing element 140. The light guide element 160A includes a first dichroic region 160A-1 and a second dichroic region 160A-2. The first dichroic region 160A-1 may allow light with a same wavelength as that of the excitation light beam B to penetrate through and reflect light with other wavelengths. The second dichroic region 160A-2 may transflect the light with the same wavelength as that of the excitation light beam B and reflect light with other wavelengths. The excitation light beam B emitted by the light source module 110 penetrates through the first dichroic region 160A-1 of the light guide element 160A and is transmitted to the phosphor wheel 120.

Figure 1B:
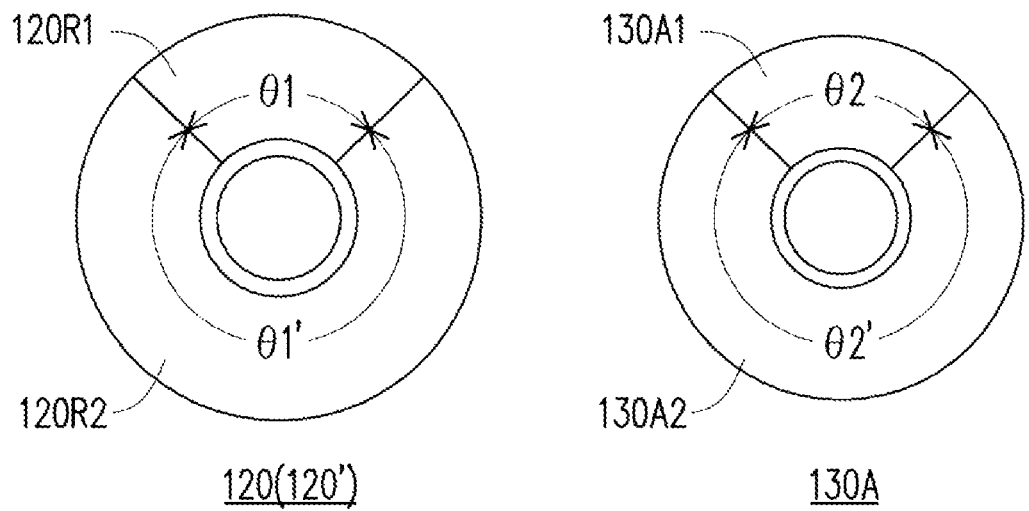
FIG. 1B is a schematic diagram of a phosphor wheel and a light recycling element of FIG. 1A.

FIG. 1B is a schematic diagram of the phosphor wheel and the light recycling element of FIG. 1A. Referring to FIG. 1A and FIG. 1B at the same time, in the embodiment, the phosphor wheel 120 includes a non-phosphor region 120R1 and a phosphor region 120R2, and the light recycling element 130A includes a penetration region 130A1 and a light splitting region 130A2, where the light splitting region 130A2 may reflect the light with the same wavelength as that of the excitation light beam B and allow the light of the other wavelengths to penetrate through. In addition, taking a situation that the excitation light beam B is blue light as an example, the phosphor region 120R2 may convert the blue light into red light, green light, yellow light or light of other wavelengths. It should be noted that in the embodiment, both of the non-phosphor region 120R1 and the phosphor region 120R2 of the phosphor wheel 120 have a reflective function, but the invention is not limited thereto.

The phosphor wheel 120 and the light recycling element 130A of the embodiment are wheel devices, which are used to rotate wheels to cut different regions of the wheels into the transmission path of the excitation light beam B at different timings. In detail, at a first timing of the embodiment, the non-phosphor region 120R1 of the phosphor wheel 120 and the penetration region 130A1 of the light recycling element 130A are cut into the transmission path of the excitation light beam B. After being reflected by the non-phosphor region 120R1, the excitation light beam B is transmitted to the light guide element 160A. A part of the excitation light beam B is reflected by the second dichroic region 160A-2 of the light guide element 160A to sequentially penetrate through the penetration region 130A1 of the light recycling element 130A and the light uniformizing element 140. The other part of the excitation light beam B penetrates through the second dichroic region 160A-2, and is then reflected by the reflective element 102 and sequentially penetrates the first dichroic region 160A-1 of the light guide element 160A, the penetration region 130A1 of the light recycling element 130A, and the light uniformizing element 140. After the aforementioned part and the other part of the excitation light beam penetrate through the light uniformizing element 140, the illumination system 100A outputs first light in the illumination light beam I. Namely, a wavelength of the first light is the same as the wavelength of the excitation light beam B.

At a second timing of the embodiment, the phosphor region 120R2 of the phosphor wheel 120 and the light splitting region 130A2 of the light recycling element 130A are cut into the transmission path of the excitation light beam B. The excitation light beam B is transmitted to the phosphor region 120R2 of the phosphor wheel 120, where a part of the excitation light beam B transmitted to the phosphor region 120R2 is converted into a first converted light beam CB1, and the other part of the excitation light beam B transmitted to the phosphor region 120R2 and not converted by the phosphor region 120R2 forms an unconverted light beam UCB (for example, reflected by the phosphor region 120R2), where a wavelength of the unconverted light beam UCB is the same as the wavelength of the excitation light beam B. The unconverted light beam UCB is transmitted to the light splitting region 130A2 of the light recycling element 130A through the same light path as that of the excitation light beam B in the first timing, and is reflected by the light splitting region 130A2 of the light recycling element 130A to form a recycled light beam RB. The recycled light beam RB is then transmitted to the phosphor region 120R2 of the phosphor wheel 120 through a light path opposite to that of the excitation light beam B in the first timing, and a part of the recycled light beam RB is converted into a second converted light beam CB2. The first converted light beam CB1 and the second converted light beam CB2 are transmitted to the light uniformizing element 140 in the same path: reflected by the light guide element 160A, penetrating through the light splitting region 130A2 of the light recycling element 130A, and penetrating through the light uniformizing element 140 in sequence. Therefore, the illumination system 100A outputs second light in the illumination light beam I (for example, including the first converted light beam CB1 and the second converted light beam CB2, where the first converted light beam CB1 and the second converted light beam CB2 have the same wavelength), where a wavelength of the second light is different to the wavelength of the excitation light beam B. At the second timing, reflectivity of the light splitting region 130A2 of the light recycling element 130A to a waveband of the unconverted light beam UCB (or the excitation light beam B) is greater than 90%.

At the second timing of the embodiment, a ratio between the excitation light beam B and the first converted light beam CB1 converted from the excitation light beam B is greater than 70% (i.e., in an illumination system without a light recycling element, a proportion that the excitation light beam is converted into the second light in the illumination light beam is only 70% at most).

It should be noted that at the second timing of the embodiment, a part of the recycled light beam RB is converted into the second converted light beam CB2, and the other part of the recycled light beam RB forms another unconverted light beam. Such another unconverted light beam then repeatedly generates a converted light beam through the same light path as that of the unconverted light beam UCB and is repeatedly recycled to form a recycled excitation light beam. In addition, the unconverted light beam UCB cannot completely form the recycled light beam RB through the light recycling element 130A. For example, a part of the unconverted light beam UCB is recycled by the light recycling element 130A through reflection of the second dichroic region 160A-2 of the light guide element 160A or the reflective element 102, but the other part of the unconverted light beam UCB penetrates through the first dichroic region 160A-1 of the light guide element 160A and cannot be recycled. Therefore, a ratio of the excitation light beam B emitted by the light source module 110 to the part of the excitation light beam B converted into the converted light beam satisfies the following relationship:

$$n + (1-n) \times m \times n + [(1-n) \times m] \times (1-n) \times m \times n + \ldots = \\ n + (1-n) \times m \times n \times \frac{1}{1-(1-n) \times m}$$

where, n is a phosphor conversion rate of the phosphor region 120R2 of the phosphor wheel 120 (i.e., a ratio that the excitation light beam B is converted into the first converted light beam CB1), and m is a recycling rate of the excitation light beam B (i.e., a ratio between the recycled light beam RB and the unconverted light beam UCB). Alternatively, a ratio of the excitation light beam B emitted by the light source module 110 to the part of the excitation light beam B that is not converted into the converted light beam satisfies the following relationship:

$$n' \times m \times (n' + m)^2 + (n' + m)^3 + \ldots = (n' + m) \times \frac{1}{1 - n' \times m}$$

where, n' is a phosphor unconverted rate of the phosphor region 120R2 of the phosphor wheel 120 (i.e., a ratio between the unconverted light beam UCB and the excitation light beam B). Since the illumination system 100A is provided with the light recycling element 130A to continuously recycle the unconverted excitation light beam, a proportion of the excitation beam converted into the second light in the illumination light beam may be increased to more than 90%.

In the embodiment, a central angle θ2 of the penetration region 130A1 of the light recycling element 130A is the same as a central angle θ1 of the non-phosphor region 120R1 of the phosphor wheel 120, and a central angle θ2' of the light splitting region 130A2 of the light recycling element 130A is the same as a central angle θ1' of the phosphor region 120R2 of the phosphor wheel 120. Namely, an area ratio between the penetration region 130A1 and the light splitting region 130A2 of the light recycling element 130A is the same as an area ratio between the non-phosphor region 120R1 and the phosphor region 120R2 of the phosphor wheel 120.

Figure 1C:
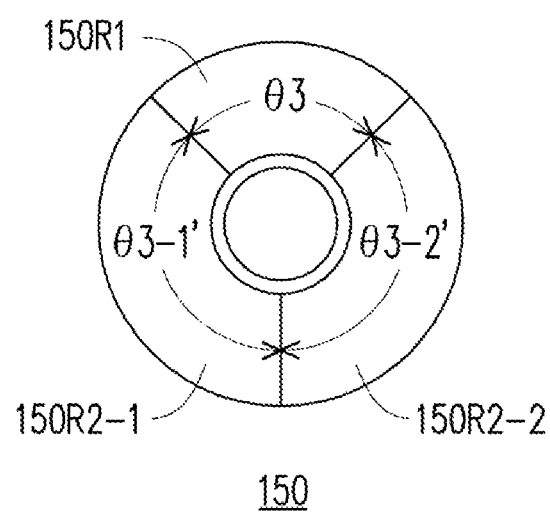
FIG. 1C is a schematic diagram of a filter color wheel of FIG. 1A.

In an embodiment, the illumination system further includes a filter color wheel 150. FIG. 1C is a schematic diagram of a filter color wheel of FIG. 1A. Referring to FIG. 1A to FIG. 1C at the same time, the filter color wheel 150 is disposed between the light recycling element 130A and the light uniformizing element 140. The filter color wheel 150 has an excitation light penetration region 150R1 and at least one non-excitation light penetration region 150R2-1, 150R2-2, where the excitation light penetration region 150R1 allows light with the same wavelength as that of the excitation light beam B to penetrate through, and the different non-excitation light penetration regions 150R2-1, 150R2-2 allow light of different wavelengths to penetrate through. A central angle θ3 of the excitation light penetration region 150R1 of the filter color wheel 150 is the same as the central angle θ2 of the penetration region 130A1 of the light recycling element 130A, and a sum of central angles Θ3-1' and θ3-2' of the non-excitation light penetration regions 150R2-1, 150R2 of the filter color wheel 150 is the same as the central angle θ2' of the light splitting region 130A2 of the light recycling element 130A. Namely, an area ratio between the penetration region 130A1 and the light splitting region 130A2 of the light recycling element 130A is the same as an area ratio between the excitation light penetration region 150R1 and the sum of the non-excitation light penetration regions 150R2-1, 150R2 of the filter color wheel 150.

At the first timing of an embodiment, the excitation light beam B is transmitted to the excitation light penetration region 150R1 of the filter color wheel 150. Namely, the excitation light penetration region 150R1 is cut into the transmission path of the excitation light beam B. At the second timing, the first converted light beam CB1 and second converted light beam CB2 are transmitted to the at least one non-excitation light penetration region (for example, the non-excitation light penetration regions 150R2-1, 150R2-2) of the filter color wheel 150. To be specific, the second timing may include at least one second sub-timing, and the non-excitation light penetration regions 150R2-1 and 150R2-2 are respectively cut into the transmission paths of the first converted light beam CB1 and the second converted light beam CB2 at different second sub-timings. In this way, the first converted light beam CB1 and the second converted light beam CB2 may be filtered at the same time, so as to sequentially generate the second light (for example, corresponding to the non-excitation light penetration region 150R2-1) and third light (for example, corresponding to the non-excitation light penetration region 150R2-2) in the illumination light beam I output by the illumination system 100A at the second timing, where a wavelength of the second light is different from a wavelength of the third light. It should be noted that the first converted light beam CB1 and the second converted light beam CB2 are continuously transmitted to the filter color wheel 150 during a period of the second timing.

In the embodiment, the illumination system 100A may further include lens groups 104, 106, and 108. The lens group 104 is disposed between the light source module 110 and the light guide element 160A, and is configured to collimate the excitation light beam B. The lens group 106 is disposed between the phosphor wheel 120 and the light guide element 160A, and the lens group 106 is configured to collimate the unconverted light beam UCB, the first converted light beam CB1 and the second converted light beam CB2. The lens group 108 is disposed between the light guide element 160A and the light recycling element 130A, and is configured to contract (converge) the first converted light beam CB1 and the second converted light beam CB2 to enter the light uniformizing element 140. An optical axis 108A of the lens group 108 and a central axis 130AC of the light recycling element 130A are parallel to each other.

In an embodiment, the light recycling element 130A may be directly disposed on the filter color wheel 150. In another embodiment, the light recycling element 130A and the filter color wheel 150 may be integrated into the same element. In another embodiment, the light recycling element 130A and the phosphor wheel 120 may be integrated into the same element, where the penetration region 130A1 and the light splitting region 130A2 of the light recycling element 130A are, for example, disposed in a peripheral region of the phosphor wheel 120, and through different optical designs, various light beams may be transmitted to the light recycling element 130A integrated with the phosphor wheel 120.

Based on the above description, in the illumination system 100A and the projection apparatus 10 of an embodiment of the invention, since the illumination system 100A and the projection apparatus 10 are provided with the light recycling element 130A, the light recycling element 130A reflects the unconverted light beam UCB to form the recycled light beam RB, and the reflectivity of the light recycling element 130A to the waveband of the unconverted light beam UCB is greater than 90%. Therefore, the light energy utilization rate of the illumination system 100A and the projection apparatus 10 is effectively improved.

Figure 2:
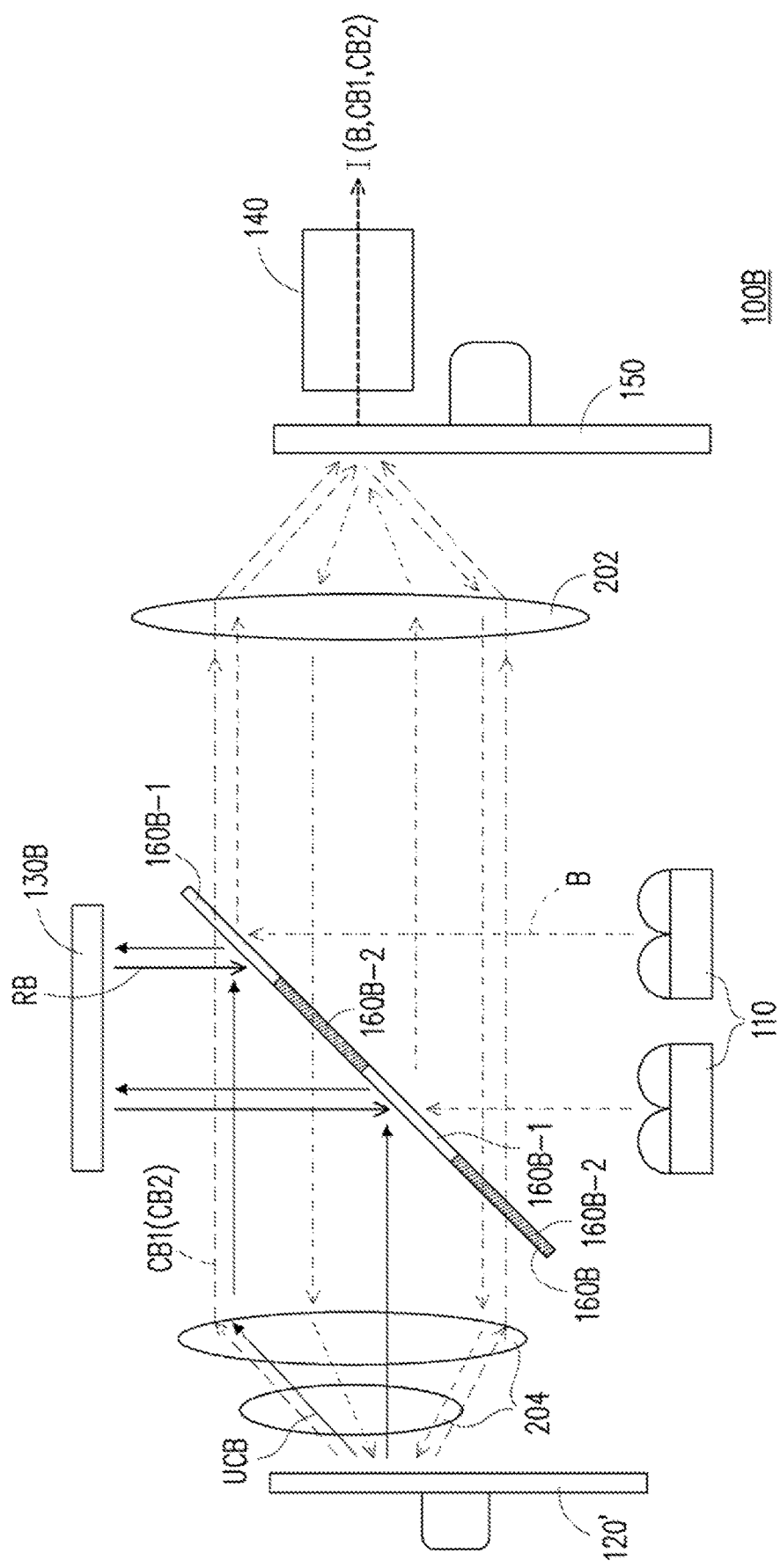
FIG. 2 is a schematic diagram of an illumination system according to another embodiment of the invention.

FIG. 2 is a schematic diagram of an illumination system according to another embodiment of the invention. Referring to FIG. 1B, FIG. 1C and FIG. 2, in the embodiment, a main difference between an illumination system 100B of FIG. 2 and the illumination system 100A of FIG. 1 is that configuring positions of optical elements are different and a light recycling element 130B is not disposed on the transmission path of the first converted light beam CB1 and the second converted light beam CB2. In detail, the illumination system 100B includes a light source module 110, a light guide element 160B, the light recycling element 130B, a phosphor wheel 120', the light uniformizing element 140, and the filter color wheel 150. The light guide element 160B includes a dichroic region 160B-1 and a penetration region 160B-2, where the dichroic region 160B-1 reflects light with the same wavelength as that of the excitation light beam B and allows light of the other wavelengths to penetrate through, and the penetration region 160B-2 allows light of a full waveband to penetrate through. The light recycling element 130B is a mirror, and the light recycling element 130B and the light source module 110 are disposed on two opposite sides of the light guide element 160B. The filter color wheel 150 and the phosphor wheel 120' are disposed on two opposite sides of the illumination system 100B. To be specific, the light recycling element 130B and the phosphor wheel 120' are disposed on the same side of the light guide element 160B, and the light source module 110 and the filter color wheel 150 are disposed on the same side of the light guide element 160B.

At a first timing of the embodiment, the excitation light beam B emitted by the light source module 110 is reflected by the dichroic region 160B-1 of the light guide element 160B to the filter color wheel 150, and the excitation light penetration region 150R1 of the filter color wheel 150 is cut into the transmission path of the excitation light beam B, and the excitation light beam B penetrates through the excitation light penetration region 150R1 of the filter color wheel 150 and the light uniformizing element 140, so that the illumination system 100B outputs the first light in the illumination light beam I.

At a second timing of the embodiment, the excitation light beam B emitted by the light source module 110 is reflected by the dichroic region 160B-1 of the light guide element 160B to the filter color wheel 150, and the non-excitation light penetration regions 150R2-1, 150R-2 of the filter color wheel 150 are sequentially cut into the transmission path of the excitation light beam B, so that the excitation light beam B is reflected by the non-excitation light penetration regions 150R2-1, 150R2-2 of the filter color wheel 150, and the reflected excitation light beam B penetrates through the penetration region 160B-2 of the light guide element 160B and is transmitted to the phosphor wheel 120'. The phosphor region 120R2 of the phosphor wheel 120' is cut into the transmission path of the excitation light beam B, so that a part of the excitation light beam B transmitted to the phosphor region 120R2 is converted into the first converted light beam CB1, and the other part of the excitation light beam B transmitted to the phosphor region 120R2 forms an unconverted light beam UCB. The unconverted light beam UCB is transmitted to the light guide element 160B, and is reflected to the light recycling element 130B by the dichroic region 160B-1 of the light guide element 160B. The unconverted light beam UCB is reflected by the light recycling element 130B to form a recycled light beam RB, and the recycled light beam RB is reflected back to the phosphor wheel 120' along a light path opposite to that of the unconverted light beam UCB, and a part of the recycled light beam RB is converted into the second converted light beam CB2 by the phosphor wheel 120'. The first converted light beam CB1 and the second converted light beam CB2 are transmitted to the light uniformizing element 140 in the same path (transmitted at the same time): sequentially penetrating through the light guide element 160B, the non-excitation light penetration region 150R2-1 (or the non-excitation light penetration region 150R2-2) of the filter color filter 150 and the light uniformizing element 140. Therefore, the illumination system 100B outputs the second light (or the third light) in the illumination light beam I.

In an embodiment, the phosphor wheel 120' may only include the phosphor region 120R2.

In the embodiment, a light incident surface of the light recycling element 130B is perpendicular to a light incident surface of the phosphor wheel 120'.

In the embodiment, the illumination system 100B further includes lens groups 202 and 204. The lens group 202 is disposed between the light guide element 160B and the filter color wheel 150, and is configured to contract (converge) the excitation light beam B to enter the light uniformizing element 140. The lens group 204 is disposed between the phosphor wheel 120' and the light guide element 160B, and is configured to collimate the unconverted light beam UCB, the first converted light beam CB1 and the second converted light beam CB2.

Based on the above description, in the illumination system 100B of an embodiment of the invention, since the light recycling element 130B and the light source module 110 are disposed on two opposite sides of the light guide element 160B, and the filter color wheel 150 and the phosphor wheel 120' are disposed on two opposite sides of the light guide element 160B different from that of the light recycling element 130B and the light source module 110, the optical elements in the illumination system 100B are respectively disposed around the light guide element 160B, and an overall volume of the illumination system 100B is relatively small.

Figure 3:
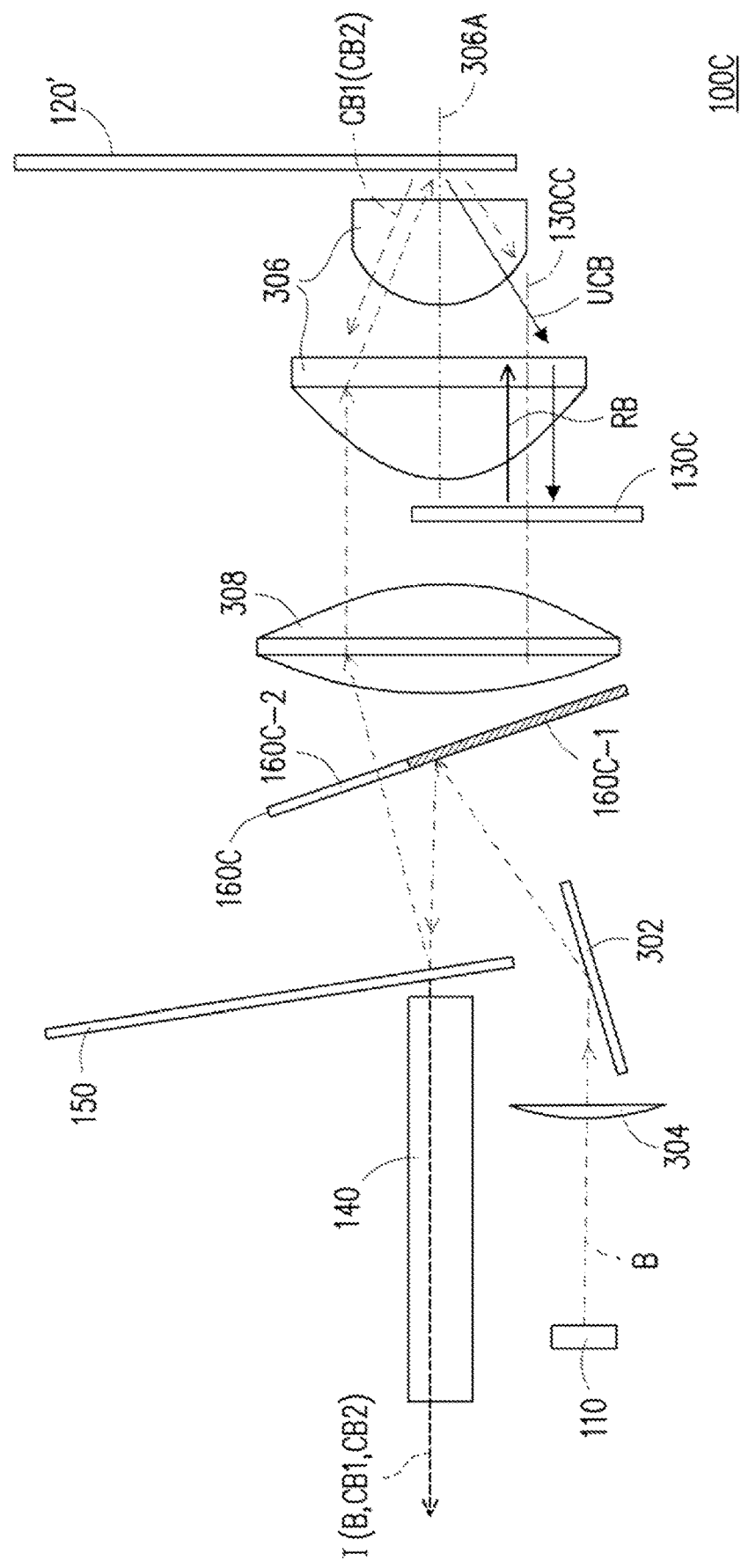
FIG. 3 is a schematic diagram of an illumination system according to another embodiment of the invention.

FIG. 3 is a schematic diagram of an illumination system according to another embodiment of the invention. Referring to FIG. 1B, FIG. 1C and FIG. 3, in the embodiment, a main difference between an illumination system 100C of FIG. 3 and the illumination system 100A of FIG. 1 is that configuring positions of the optical elements are different and in the first timing, the excitation light beam B emitted by the light source module 110 does not pass through the phosphor wheel 120' and the light recycling element 130C. In detail, the light recycling element 130C is disposed between the phosphor wheel 120' and the light uniformizing element 140. The light recycling element 130C is a light splitter for reflecting light with the same wavelength as that the excitation light beam B and allowing light of other wavelengths to penetrate through, for example, allowing the first converted light beam CB1 and the second converted light beam CB2 to penetrate through, and reflecting the unconverted light beam UCB.

In the embodiment, the illumination system 100C further includes the filter color wheel 150 and a light guide element 160C. The light guide element 160C includes a dichroic region 160C-1 and a penetration region 160C-2, where the dichroic region 160C-1 is configured to reflect light with the same wavelength as that of the excitation light beam B and allow light of other wavelengths to penetrate through, and the penetration region 160C-2 is configured to allow the excitation light beam B from the filter color wheel 150 to pass through. Furthermore, the non-excitation light penetration regions 150R2-1 and 150R2-2 of the filter color wheel 150 are used to reflect the excitation light beam B. In the embodiment, the excitation light beam B emitted by the light source module 110 is reflected to the filter color wheel 150 by the dichroic region 160C-1 of the light guide element 160C.

At the first timing of the embodiment, the excitation light beam B emitted by the light source module 110 is transmitted to the dichroic region 160C-1 of the light guide element 160C, and is reflected to the filter color wheel 150 by the dichroic region 160C-1 of the light guide element 160C. The excitation light beam B penetrates through the excitation light penetration region 150R1 of the filter color wheel 150 and the light uniformizing element 140, so that the illumination system 100C outputs the first light in the illumination light beam I.

At the second timing of the embodiment, the excitation light beam B emitted by the light source module 110 is also transmitted to the dichroic region 160C-1 of the light guide element 160C, and is reflected to the filter color wheel 150 by the dichroic region 160C-1 of the light guide element 160C. The non-excitation light penetration regions 150R2-1 and 150R2-2 of the filter color wheel 150 are cut into the transmission path of the excitation light beam B to reflect the excitation light beam B, and the reflected excitation light beam B penetrates through the penetration region 160C-2 of the light guide element 160C and is transmitted to the phosphor wheel 120'. The phosphor region 120R2 of the phosphor wheel 120' converts a part of the excitation light beam B transmitted to the phosphor region 120R2 into the first converted light beam CB1, and the other part of the excitation light beam B transmitted to the phosphor region 120R2 forms an unconverted light beam UCB. The unconverted light beam UCB is first transmitted to the light recycling element 130C, and is then reflected by the light recycling element 130C to form a recycled light beam RB. The recycled light beam RB is then reflected back to the phosphor wheel 120' along a light path opposite to that of the unconverted light beam UCB. A part of the recycled light beam RB is converted into the second converted light beam CB2. A part of the first converted light beam CB1 and the second converted light beam CB2 are transmitted to the light uniformizing element 140 in the same path (transmitted at the same time): sequentially penetrating through the light recycling element 130C, the light guide element 160B (for example, the dichroic region 160C-1), the non-excitation light penetration region 150R2-1 (or the non-excitation light penetration region 150R2-2) of the filter color wheel 150 and the light uniformizing element 140; the other part of the first converted light beam CB1 and the second converted light beam CB2 are transmitted to the light uniformizing element 140 in the same path (transmitted at the same time): sequentially penetrating through the light guide element 160B (for example, the penetration region 160C-2), the non-excitation light penetration region 150R2-1 (or the non-excitation light penetration region 150R2-2) of the filter color wheel 150 and the light uniformizing element 140. Therefore, the illumination system 100C outputs the second light (or the third light) in the illumination light beam I. Specifically, in other embodiments, the light guide element 160C may only include the dichroic region 160C-1 without the penetration region 160C-2, so that the excitation light beam B reflected by the filter color wheel 150 may be transmitted to the phosphor wheel 120' without passing through the light guide element 160C.

In the embodiment, a light incident surface of the light recycling element 130C is parallel to a light incident surface of the phosphor wheel 120', and a light incident surface of the light guide element 160C is not parallel to the light incident surface of the phosphor wheel 120', but the invention is not limited thereto. In other embodiments, the light incident surface of the light guide element 160C may be parallel to the light incident surface of the phosphor wheel 120'.

In the embodiment, the illumination system 100C further includes a reflective element 302 and lens groups 304, 306, and 308. The lens group 304 is disposed between the reflective element 302 and the light source module 110, and the reflective element 302 is disposed between the lens group 304 and the light guide element 160C. The excitation light beam B emitted by the light source module 110 is collimated by the lens group 304, and is then reflected to the dichroic region 160C-1 of the light guide element 160C by the reflective element 302. The lens group 306 is disposed between the light recycling element 130C and the phosphor wheel 120', and is configured to collimate the unconverted light beam UCB, the first converted light beam CB1 and the second converted light beam CB2. An optical axis 306A of the lens group 306 passes through the light recycling element 130C. The optical axis 306A of the lens group 306 is parallel to a central axis 130CC of the light recycling element 130C, and the central axis 130CC of the light recycling element 130C deviates from the optical axis 306A of the lens group 306 in a direction approaching the light source module 110. The lens group 308 is disposed between the light recycling element 130C and the light guide element 160C.

Based on the above description, in the illumination system 100C of an embodiment of the invention, since the filter color wheel 150 and the phosphor wheel 120' are disposed on two opposite sides of the illumination system 100C, and various components in the illumination system 100C are disposed in a direction along the central axis 130CC of the light recycling element 130C, an overall width of the illumination system 100C is relatively small.

Figure 4A:
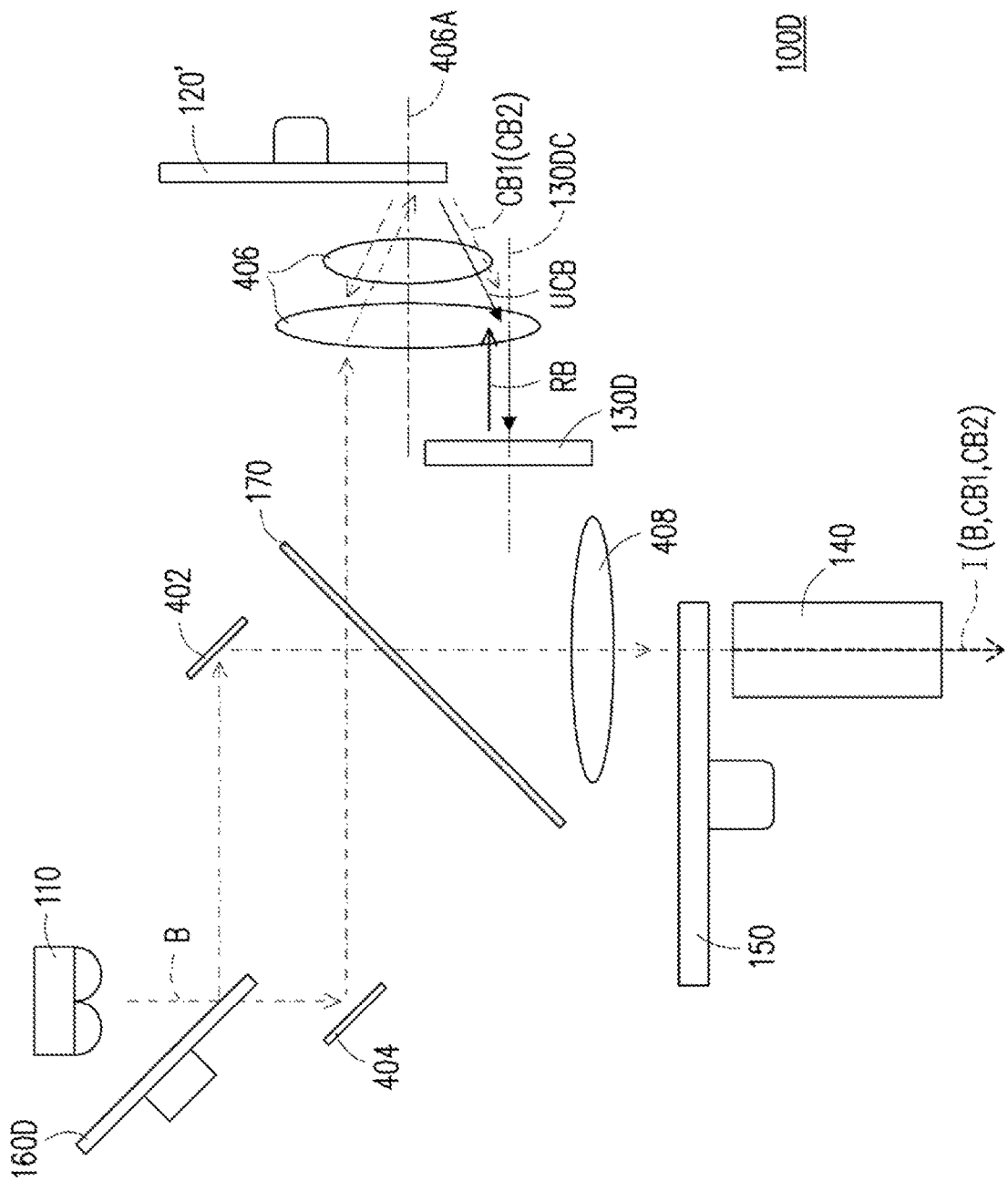
FIG. 4A is a schematic diagram of an illumination system according to another embodiment of the invention.
Figure 4B:
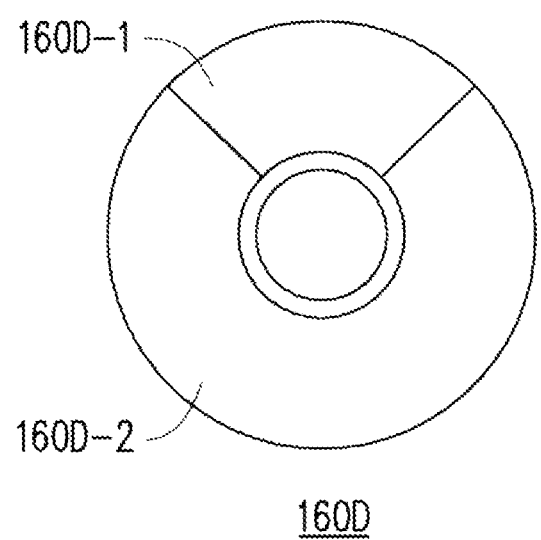
FIG. 4B is a schematic diagram of a light guide element of FIG. 4A.

FIG. 4A is a schematic diagram of an illumination system according to another embodiment of the invention, and FIG. 4B is a schematic diagram of a light guide element of FIG. 4A. Referring to FIG. 1B, FIG. 1C, FIG. 4A and FIG. 4B at the same time, in the embodiment, a main difference between an illumination system 100D of FIG. 4A and the illumination system 100A of FIG. 1 is that at the first timing, the excitation light beam B does not pass through the phosphor wheel 120' and a light recycling element 130D. In detail, the light recycling element 130D is a light splitter, and is configured to allow the first converted light beam CB1 and the second converted light beam CB2 to pass through and reflect the unconverted light beam UCB.

In the embodiment, the illumination system 100D includes the light source module 110, the filter color wheel 150, a light guide element 160D, the phosphor wheel 120', a light recycling element 130D, the light uniformizing element 140, and a light splitting element 170. The filter color wheel 150 is disposed between the light source module 110 and the light uniformizing element 140, and the filter color wheel 150 and the light source module 110 are disposed on two opposite sides of the illumination system 100D. The light splitting element 170 is disposed on the light path between the light guide element 160D and the phosphor wheel 120'. The light guide element 160D includes a reflective region 160D-1 and a penetration region 160D-2. The light splitting element 170 is configured to allow light with the same wavelength as that of the excitation light beam B to penetrate through and reflect light of the other wavelengths.

At the first timing of the embodiment, the reflective region 160D-1 of the light guide element 160D is cut into the transmission path of the excitation light beam B emitted by the light source module 110. The excitation light beam B reflected by the reflective region 160D-1 sequentially penetrates through the light splitting element 170, the excitation light penetration region 150R1 of the filter color wheel 150 (the excitation light penetration region 150R1 of the filter color wheel 150 is cut into the transmission path of the excitation light beam B) and the light uniformizing element 140, so that the illumination system 100D outputs the first light in the illumination light beam I.

At the second timing of the embodiment, the penetration region 160D-2 of the light guide element 160D is cut into the transmission path of the excitation light beam B. The excitation light beam B sequentially passes through the penetration region 160D-2 of the light guide element 160D and the light splitting element 170, and is transmitted to the phosphor wheel 120'. The phosphor region 120R2 of the phosphor wheel 120' converts a part of the excitation light beam B transmitted to the phosphor region 120R2 into the first converted light beam CB1, and the other part of the excitation light beam B transmitted to the phosphor region 120R2 forms an unconverted light beam UCB. The unconverted light beam UCB is first transmitted to the light recycling element 130D, and is then reflected by the light recycling element 130D to form a recycled light beam RB. The recycled light beam RB is then reflected back to the phosphor wheel 120' along a light path opposite to that of the unconverted light beam UCB. A part of the recycled light beam RB is converted into the second converted light beam CB2. A part of the first converted light beam CB1 and the second converted light beam CB2 are transmitted to the light uniformizing element 140 in the same path (transmitted at the same time): penetrating through the light recycling element 130D, reflected by the light splitting element 170, penetrating through the non-excitation light penetration region 150R2-1 (or the non-excitation light penetration region 150R2-2) of the filter color wheel 150 and penetrating through the light uniformizing element 140 in sequence; the other part of the first converted light beam CB1 and the second converted light beam CB2 are transmitted to the light uniformizing element 140 in the same path (transmitted at the same time): reflected by the light splitting element 170, penetrating through the non-excitation light penetration region 150R2-1 (or the non-excitation light penetration region 150R2-2) of the filter color wheel 150 and penetrating through the light uniformizing element 140 in sequence. Therefore, the illumination system 100D outputs the second light (or the third light) in the illumination light beam I.

In the embodiment, a light incident surface of the light recycling element 130D is parallel to a light incident surface of the phosphor wheel 120'. In an embodiment, the phosphor wheel 120' may only include the phosphor region 120R2.

In the embodiment, the illumination system 100D further includes reflective elements 402 and 404, and lens groups 406 and 408. The light splitting element 170 is disposed between the reflective element 402 and the lens group 408, the lens group 408 is disposed between the light splitting element 170 and the filter color wheel 150, the light splitting element 170 is disposed between the reflective element 404 and the lens group 406, and the lens group 406 is disposed between the light splitting element 170 and the phosphor wheel 120'. At the first timing, the reflective element 402 reflects the excitation light beam B reflected by the reflective region 160D-1 of the light guide element 160D to the light splitting element 170. At the second timing, the reflective element 404 reflects the excitation light beam B penetrating through the penetration region 160D-2 of the light guide element 160D to the light splitting element 170. The lens group 406 is configured to collimate the unconverted light beam UCB, the first converted light beam CB1 and the second converted light beam CB2. An optical axis 406A of the lens group 406 is parallel to a central axis 130DC of the light recycling element 130D, and the central axis 130DC of the light recycling element 130D deviates from the optical axis 406A of the lens group 406 in a direction away from the light source module 110.

Based on the above description, in the illumination system 100D of an embodiment of the invention, since various components in the illumination system 100D are respectively disposed around the light splitting element 170, an overall volume of the illumination system 100D is relatively small.

Figure 5:
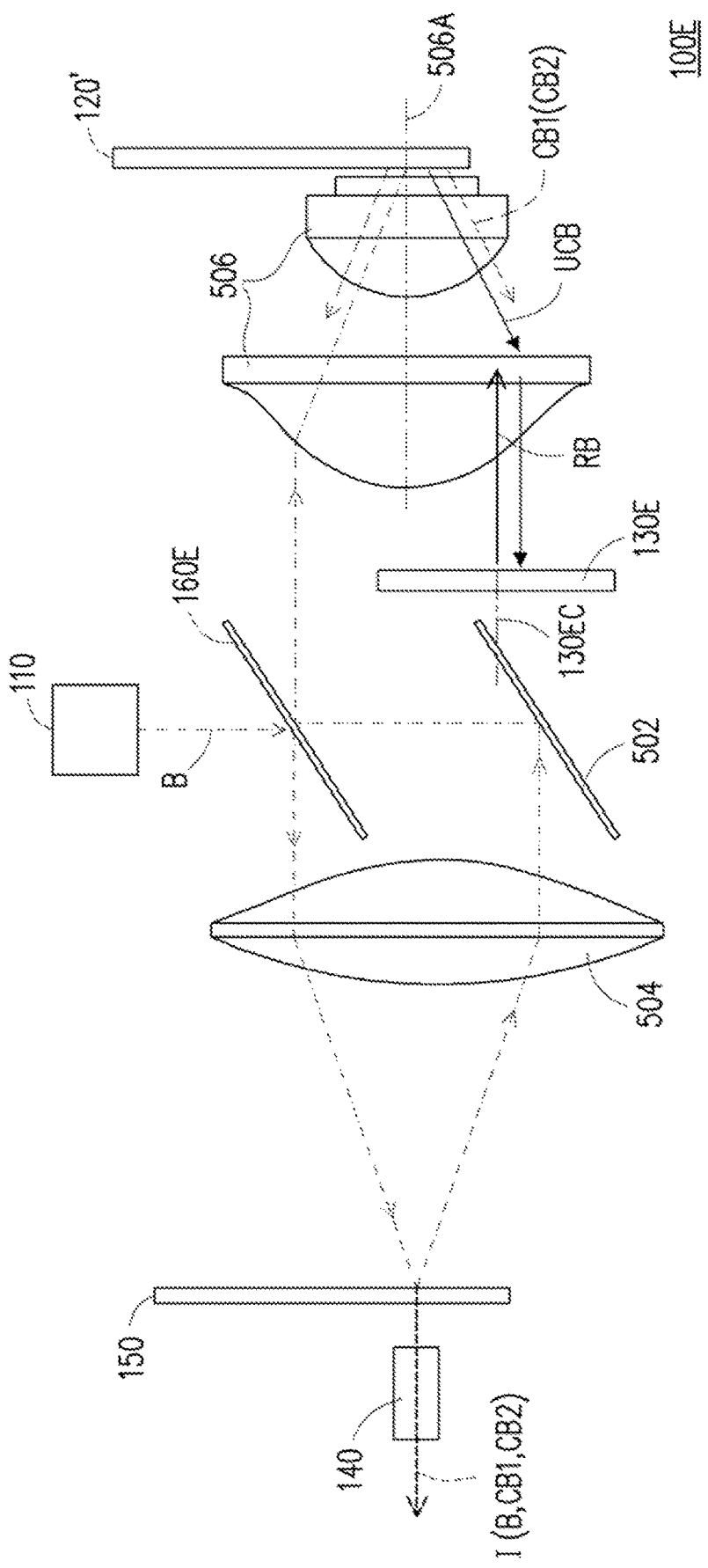
FIG. 5 is a schematic diagram of an illumination system according to another embodiment of the invention.

FIG. 5 is a schematic diagram of an illumination system according to another embodiment of the invention. Referring to FIG. 1B, FIG. 1C and FIG. 5, in the embodiment, a main difference between an illumination system 100E of FIG. 5 and the illumination system 100A FIG. 1 is that at the first timing, the excitation light beam B does not pass through the phosphor wheel 120' and a light recycling element 130E. In detail, a light guide element 160E of the illumination system 100E is a polarization light splitter, where the light guide element 160E may reflect P-polarized light and allow S-polarized light to penetrate through, or reflect the S-polarized light and allow the P-polarized light to penetrate through. The light recycling element 130E is a mirror. In the embodiment, the light recycling element 130E is disposed between the phosphor wheel 120' and the light uniformizing element 140. In the embodiment, the filter color wheel 150 and the phosphor wheel 120' of the illumination system 100E are disposed on two opposite sides of the illumination system 100E.

Taking a situation that the light guide element 160E reflects the P-polarized light and allows the S-polarized light to pass through as an example, at the first timing of the embodiment, the P-polarized light in the excitation light beam B is reflected to the filter color wheel 150 by the light guide element 160E, and the S-polarized light in the excitation light beam B penetrates through the light guide element 160E and is then transmitted to the filter color wheel 150. The excitation light beam B (including the P-polarized light and the S-polarized light) penetrates through the excitation light penetration region 150R1 of the filter color wheel 150 (the excitation light penetration region 150R1 of the filter color wheel 150 is cut into the transmission path of the excitation light beam B) and the light uniformizing element 140, so that the illumination system 100E outputs the first light in the illumination light beam I.

At the second timing of the embodiment, the P-polarized light and the S-polarized light in the excitation light beam B are also transmitted to the filter color wheel 150. The non-excitation light penetration regions 150R2-1, 150R2-2 of the filter color wheel 150 (the non-excitation light penetration regions 150R2-1, 150R2-2 of the filter color wheel 150 are sequentially cut into the transmission path of the excitation light beam B) reflect the excitation light beam B. The P-polarized light of the reflected excitation light beam B is then reflected to the phosphor wheel 120' by the light guide element 160E, and the S-polarized light of the reflected excitation light beam B penetrates through the light guide element 160E and is then transmitted to the phosphor wheel 120'. The phosphor region 120R2 of the phosphor wheel 120' converts a part of the excitation light beam B transmitted to the phosphor region 120R2 into the first converted light beam CB1, and the other part of the excitation light beam B transmitted to the phosphor region 120R2 forms an unconverted light beam UCB. The unconverted light beam UCB is first transmitted to the light recycling element 130E, and is then reflected by the light recycling element 130E to form a recycled light beam RB. The recycled light beam RB is then reflected back to the phosphor wheel 120' along a light path opposite to that of the unconverted light beam UCB. A part of the recycled light beam RB is converted into the second converted light beam CB2. A part of the first converted light beam CB1 and the second converted light beam CB2 are transmitted to the light uniformizing element 140 in the same path: the P-polarized light being reflected by the light guide element 160E, penetrating through the non-excitation light penetration region 150R2-1 (or the non-excitation light penetration region 150R2-2) of the filter color wheel 150, and penetrating through the light uniformizing element 140 in sequence, and the S-polarized light penetrating through the light guide element 160E, penetrating through the non-excitation light penetration region 150R2-1 (or the non-excitation light penetration region 150R2-2) of the filter color wheel 150, and penetrating through the light uniformizing element 140 in sequence; and the other part of the first converted light beam CB1 and the second converted light beam CB2 are first transmitted to the light recycling element 130E, and then reflected to the phosphor wheel 120' by the light recycling element 130E, and then transmitted to the light uniformizing element 140 through the same optical path of the first converted light beam CB1 and the second converted light beam CB2 described above. Therefore, the illumination system 100E outputs the second light (or the third light) in the illumination light beam I.

In the embodiment, a light incident surface of the light recycling element 130E is parallel to a light incident surface of the phosphor wheel 120'. In an embodiment, the phosphor wheel 120' may only include the phosphor region 120R2.

In the embodiment, the illumination system 100E also includes a reflective element 502 and lens groups 504 and 506. The reflective element 502 is disposed between the lens group 504 and the light recycling element 130E, and may reflect the S-polarized light from the light guide element 160E to the filter color wheel 150, and reflect the excitation light beam B from the filter color wheel 150 to the light guide element 160E. The lens group 504 is disposed between the reflective element 502 and the filter color wheel 150, and is configured to collimate each light beam. The lens group 506 is disposed between the light recycling element 130E and the phosphor wheel 120', and is configured to collimate the unconverted light beam UCB, the first converted light beam CB1 and the second converted light beam CB2. An optical axis 506A of the lens group 506 passes through the light recycling element 130E. The optical axis 506A of the lens group 506 and a central axis 130EC of the light recycling element 130E are parallel to each other, and the central axis 130EC of the light recycling element 130E deviates from the optical axis 506A of the lens group 506 in a direction away from the light source module 110.

Based on the above description, in the illumination system 100E of an embodiment of the invention, since the filter color wheel 150 and the phosphor wheel 120' are disposed on two opposite sides of the illumination system 100E, and various components in the illumination system 100E are disposed in a direction along the central axis 130EC of the light recycling element 130E, an overall width of the illumination system 100E is relatively small.

Figure 6A:
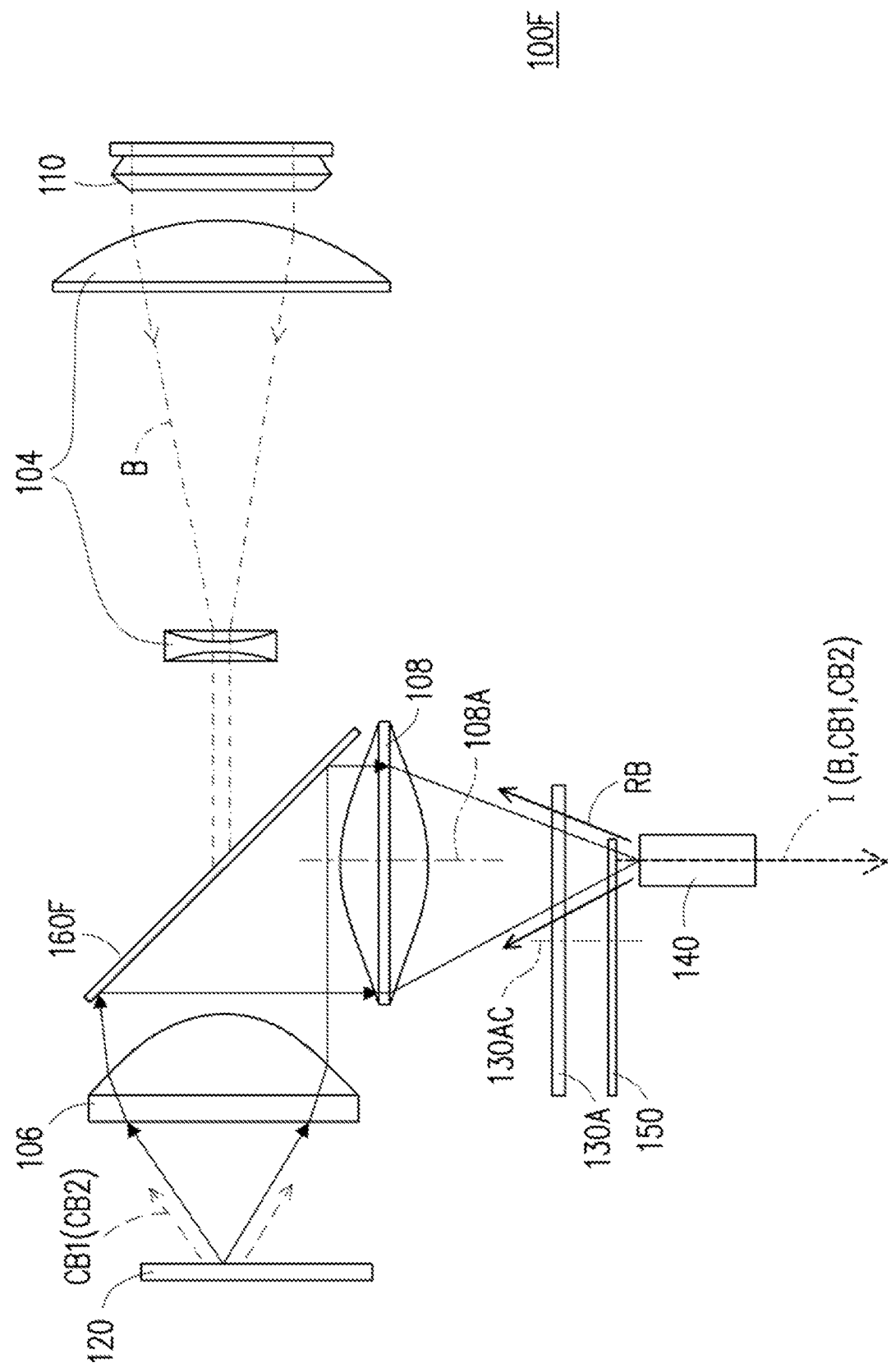
FIG. 6A is a schematic diagram of an illumination system according to another embodiment of the invention.
Figure 6B:
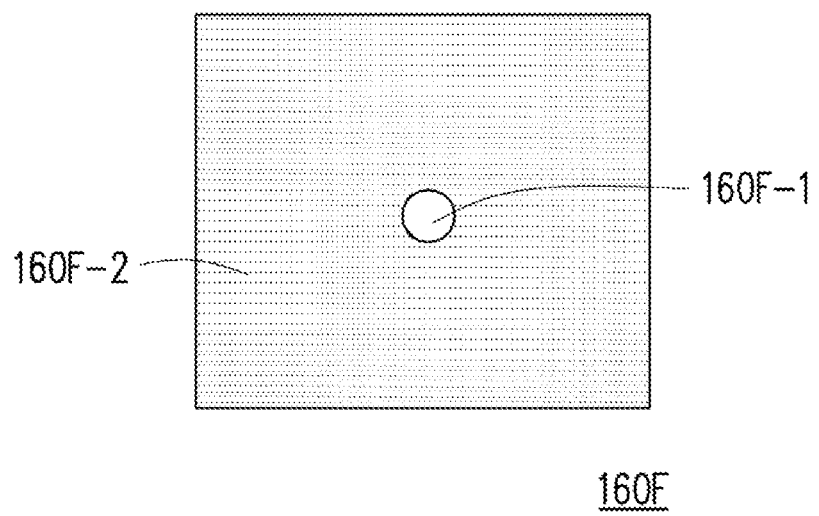
FIG. 6B is a schematic diagram of a light guide element of FIG. 6A.

FIG. 6A is a schematic diagram of an illumination system according to another embodiment of the invention. FIG. 6B is a schematic diagram of a light guide element of FIG. 6A. Referring to FIG. 1B, FIG. 6A and FIG. 6B at the same time, a main difference between an illumination system 100F of FIG. 6A and the illumination system 100A of FIG. 1 is that a light guide element 160F of FIG. 6A is different from the light guide element 160A of FIG. 1A. In detail, the light guide element 160F of the embodiment includes a dichroic region 160E-1 and a reflective region 160E-2. The dichroic region 160E-1 is disposed in a central area of the light guide element 160F, and the reflective region 160E-2 surrounds the dichroic region 160E-1. The dichroic region 160E-1 is configured to allow light with the same wavelength as that of the excitation light beam B to penetrate through and reflect light of the other wavelengths, and the reflective region 160E-2 is configured to reflect light of the full waveband.

In the embodiment, the excitation light beam B emitted by the light source module 110 is transmitted to the dichroic region 160E-1 of the light guide element 160F after being contracted or collimated by the lens group 104. The excitation light beam B penetrates through the dichroic region 160E-1 and is then transmitted to the phosphor wheel 120. The light guide element 160F of the illumination system 100F of FIG. 6A includes the functions of the light guide element 160A and the reflective element 102 of FIG. 1A. For example, the excitation light beam B from the phosphor wheel 120 is reflected by the light guide element 160F and transmitted to the penetration region 130A1 of the light recycling element 130A (the function of the reflective element 102 in FIG. 1A), for another example, the recycled light beam RB is reflected by the light guide element 160F and transmitted to the phosphor wheel 120 (the function of the reflective element 102 in FIG. 1A), so that the light paths that the illumination system 100F of FIG. 6A generates the first light and the second light in the illumination light beam I are similar to the light paths that the illumination system 100A of FIG. 1A generates the first light and the second light in the illumination light beam I, and detail thereof is not repeated.

In the embodiment, a light incident surface of the light recycling element 130A is perpendicular to a light incident surface of the phosphor wheel 120.

Based on the above description, in the illumination system 100F of an embodiment of the invention, an area size of the dichroic region 160E-1 may match a beam area of the excitation light beam B contracted by the lens group 104. Therefore, the smaller the area of the dichroic region 160E-1 is, the higher the light energy utilization rate or light recycling rate of the illumination system 100F is.

Figure 7:
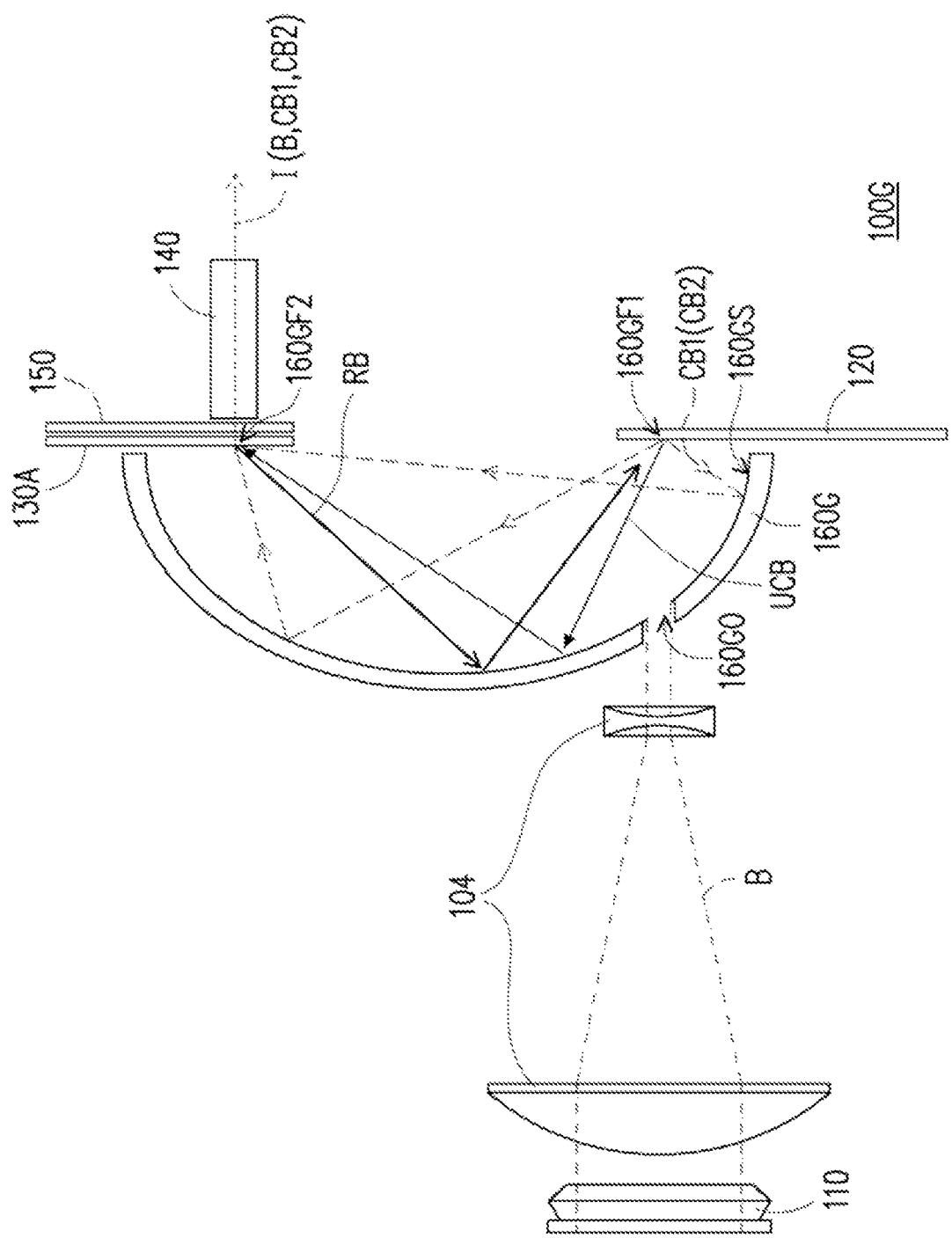
FIG. 7 is a schematic diagram of an illumination system according to another embodiment of the invention.

FIG. 7 is a schematic diagram of an illumination system according to another embodiment of the invention. Referring to FIG. 7, a main difference between an illumination system 100G of FIG. 7 and the illumination system 100F of FIG. 6A is that a light guide element 160G of FIG. 7 is different from the light guide element 160F of FIG. 6A. In detail, the light guide element 160G of the embodiment is an elliptical mirror and has a first focal point 160GF1 and a second focal point 160GF2. A reflective surface 160GS of the light guide element 160G has an opening 160GO. The phosphor wheel 120 is disposed at a side of the light guide element 160G adjacent to the first focal point 160GF1. The filter color wheel 150 and the light uniformizing element 140 are disposed at a side of the light guide element 160G adjacent to the second focal point 160GF2. The filter color wheel 150 and the light source module 110 are disposed on two opposite sides of the illumination system 100G.

In the embodiment, the excitation light beam B emitted by the light source module 110 penetrates through the opening 160GO of the light guide element 160G after being contracted or collimated by the lens group 104. Then, the excitation light beam B is further transmitted to the phosphor wheel 120. the light paths that the illumination system 100G of FIG. 7 generates the first light and the second light in the illumination light beam I are similar to the light paths that the illumination system 100F of FIG. 6A generates the first light and the second light in the illumination light beam I, and detail thereof is not repeated.

In the embodiment, a light incident surface of the light recycling element 130A is parallel to a light incident surface of the phosphor wheel 120.

Based on the above description, in the illumination system 100G of an embodiment of the invention, since the light guide element 160G is an elliptical mirror, the unconverted light beam UCB, the first converted light beam CB1 and the second converted light beam CB2 emitted from the first focal point 160GF1 may be directly transmitted to the light recycling element 130A located at the second focal point 160GF2 through reflection of the light guide element 160G, and the recycled light beam RB emitted from the second focal point 160GF2 may be directly transmitted to the phosphor wheel 120 located at the first focal point 160GF1 through the reflection of the light guide element 160G. The light energy utilization rate or light recycling rate of the illumination system 100G is relatively high.

Figure 8:
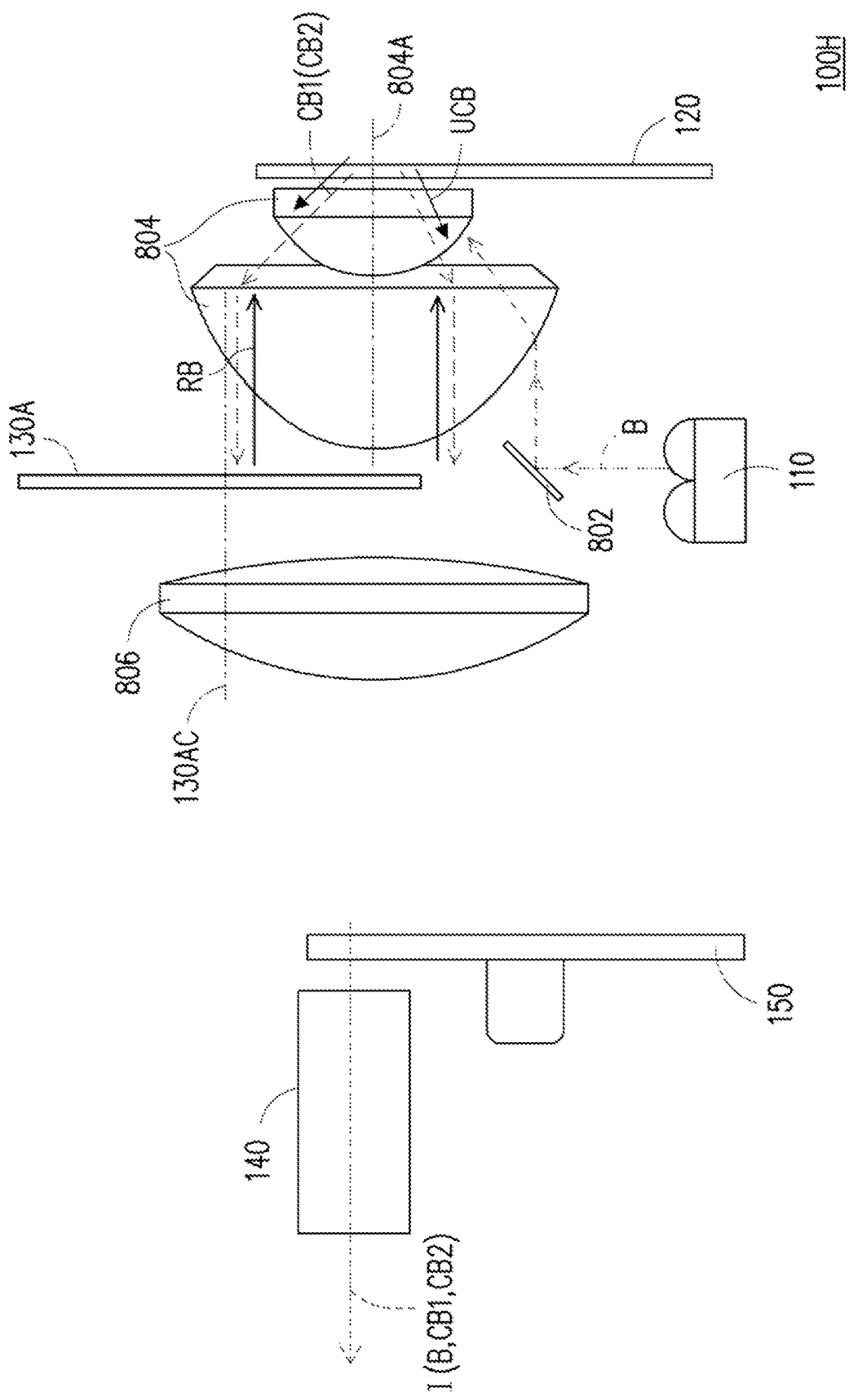
FIG. 8 is a schematic diagram of an illumination system according to another embodiment of the invention.

FIG. 8 is a schematic diagram of an illumination system according to another embodiment of the invention. Referring to FIG. 1B, FIG. 1C and FIG. 8, a main difference between an illumination system 100H of FIG. 8 and the illumination system 100A of FIG. 1 is that the illumination system 100H of FIG. 8 is not provided with a light guide element. Namely, the excitation light beam B emitted by the light source module 110 is transmitted to the phosphor wheel 120 without using the light guide element. In detail, the light recycling element 130A of the embodiment is disposed between the phosphor wheel 120 and the light uniformizing element 140, the filter color wheel 150 is disposed between the light recycling element 130A and the light uniformizing element 140, and the filter color wheel 150 and the phosphor wheel 120 are disposed on two opposite sides of the illumination system 100H.

At a first timing of the embodiment, the excitation light beam B emitted by the light source module 110 is transmitted to the non-phosphor region 120R1 of the phosphor wheel 120, and the excitation light beam B emitted from the non-phosphor region 120R1 of the phosphor wheel 120 sequentially penetrates through the penetration region 130A1 of the light recycling element 130A, the excitation light penetration region 150R1 of the filter color wheel 150 and the light uniformizing element 140, so that the illumination system 100H outputs the first light in the illumination light beam I.

At a second timing of the embodiment, the excitation light beam B emitted by the light source module 110 is transmitted to the phosphor region 120R2 of the phosphor wheel 120. The phosphor region 120R2 of the phosphor wheel 120 converts a part of the excitation light beam B transmitted to the phosphor region 120R2 into the first converted light beam CB1, and the other part of the excitation light beam B transmitted to the phosphor region 120R2 forms an unconverted light beam UCB. The unconverted light beam UCB is first transmitted to the light splitting region 130A2 of the light recycling element 130A, and is then reflected by the light splitting region 130A2 of the light recycling element 130A to form a recycled light beam RB. The recycled light beam RB is then reflected back to the phosphor wheel 120 along a light path opposite to that of the unconverted light beam UCB. A part of the recycled light beam RB is converted into a second converted light beam CB2. The first converted light beam CB1 and the second converted light beam CB2 are transmitted to the light uniformizing element 140 in the same path: sequentially penetrating through the light splitting region 130A2 of the light recycling element 130A2, the non-excitation light penetration region 150R2-1 (or the non-excitation light penetration region 150R2-2) of the filter color wheel 150 and the light uniformizing element 140. Therefore, the illumination system 100H outputs the second light (or the third light) in the illumination light beam I.

In the embodiment, a light incident surface of the light recycling element 130A is parallel to a light incident surface of the phosphor wheel 120.

In the embodiment, the illumination system 100H further includes a reflective element 802 and lens groups 804 and 806. The light source module 110, the reflective element 802, and the light recycling element 130A are disposed in sequence in a direction perpendicular to a central axis 130AC of the light recycling element 130A. The lens group 804 is disposed between the light recycling element 130A and the phosphor wheel 120, and the light recycling element 130A is disposed between the lens group 804 and the lens group 806. The excitation light beam B emitted from the light source module 110 is reflected by the reflective element 802, penetrates through the lens group 804, and is then transmitted to the phosphor wheel 120 in sequence. The lens group 804 is configured to collimate the excitation light beam B, the unconverted light beam UCB, the first converted light beam CB1 and the second converted light beam CB2, for example, the excitation light beam B from the phosphor wheel 120 is transmitted to the penetration region 130A1 of the light recycling element 130A, and the unconverted light beam UCB, the first converted light beam CB1 and the second converted light beam CB2 are all transmitted to the light splitting region 130A2 of the light recycling element 130A. An optical axis 804A of the lens group 804 and the central axis 130AC of the light recycling element 130A are parallel to each other, the optical axis 804A of the lens group 804 passes through the light recycling element 130A, and the central axis 130AC of the light recycling element 130A deviates the optical axis 804A of the lens group 804 in a direction away from the light source module 110. The lens group 806 is configured to contract the excitation light beam B, the first converted light beam CB1 and the second converted light beam CB2 for entering the light uniformizing element 140.

Based on the above description, in the illumination system 100H of an embodiment of the invention, since the illumination system 100H is not provided with a light guide element, the light recycling element 130A and the light source module 110 are disposed on two opposite sides of the illumination system 100H, and the filter color wheel 150 and the phosphor wheel 120 are disposed on two opposite sides of the illumination system 100H different from that of the light recycling element 130A and the light source module 110, so that the various components in the illumination system 100H are respectively disposed around the reflective element 802. Therefore, an overall volume of the illumination system 100H is relatively small.

In summary, in the illumination system and the projection apparatus of an embodiment of the invention, since the illumination system and the projection apparatus are provided with a light recycling element, and the reflectivity of the light recycling element to the waveband of the unconverted light beam is greater than 90%, the light energy utilization rate of the illumination system and the projection apparatus is effectively improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, configured to provide an illumination light beam, and comprising a light source module, a phosphor wheel, a light recycling element, and a light uniformizing element, wherein:
   the light source module is configured to emit an excitation light beam;
   the phosphor wheel comprises a phosphor region;
   at a first timing, the excitation light beam is transmitted to the light uniformizing element, so that the illumination system outputs first light in the illumination light beam;
   at a second timing, the excitation light beam is transmitted to the phosphor region of the phosphor wheel, so that a part of the excitation light beam transmitted to the phosphor region is converted into a first converted light beam, and the other part of the excitation light beam transmitted to the phosphor region forms an unconverted light beam and is transmitted to the light recycling element, and is reflected by the light recycling element to form a recycled light beam, the recycled light beam is transmitted to the phosphor region of the phosphor wheel, and a part of the recycled light beam is converted into a second converted light beam, wherein the first converted light beam and the second converted light beam are transmitted to the light uniformizing element through a same path, so that the illumination system outputs second light in the illumination light beam; and
   at the second timing, reflectivity of the light recycling element to a waveband of the unconverted light beam is greater than 90%.

2. The illumination system as claimed in claim 1, wherein the phosphor wheel further comprises a non-phosphor region, at the first timing, the excitation light beam is transmitted to the non-phosphor region of the phosphor wheel, and the excitation light beam is reflected by the non-phosphor region, and is transmitted to the light uniformizing element.

3. The illumination system as claimed in claim 1, wherein at the first timing, the excitation light beam does not pass through the phosphor wheel and the light recycling element.

4. The illumination system as claimed in claim 1, wherein the phosphor wheel further comprises a non-phosphor region, and the light recycling element comprises a penetration region and a light splitting region, wherein a central angle of the penetration region of the light recycling element is equal to a central angle of the non-phosphor region of the phosphor wheel, and reflectivity of the light splitting region of the light recycling element to the waveband of the excitation light beam is greater than 90%;
   at the first timing, the excitation light beam is sequentially transmitted to the non-phosphor region and the penetration region of the light recycling element; and
   at the second timing, the unconverted light beam and the first converted light beam are transmitted to the light splitting region of the light recycling element.

5. The illumination system as claimed in claim 4, further comprising:
   a filter color wheel, disposed between the light recycling element and the light uniformizing element, and having an excitation light penetration region and at least one non-excitation light penetration region, wherein a central angle of the excitation light penetration region of the filter color wheel is the same as a central angle of the penetration region of the light recycling element, and a sum of central angles of the at least one non-excitation light penetration region of the filter color wheel is the same as a central angle of the light splitting region of the light recycling element;
   at the first timing, the excitation light beam is transmitted to the excitation light penetration region of the filter color wheel; and
   at the second timing, the first converted light beam is transmitted to the at least one non-excitation light penetration region of the filter color wheel.

6. The illumination system as claimed in claim 1, wherein the light recycling element is a mirror and is not disposed on a transmission path of the first converted light beam, the illumination system further comprising:
   a filter color wheel, wherein the filter color wheel and the phosphor wheel are disposed on two opposite sides of the illumination system, and the filter color wheel has an excitation light penetration region and at least one non-excitation light penetration region;
   at the first timing, the excitation light beam is transmitted to the excitation light penetration region of the filter color wheel; and
   at the second timing, the excitation light beam is transmitted to the at least one non-excitation light penetration region of the filter color wheel and is reflected to the phosphor region of the phosphor wheel, and the first converted light beam and the second converted light beam are transmitted to the at least one non-excitation light penetration region of the filter color wheel and are transmitted to the light uniformizing element.

7. The illumination system as claimed in claim 1, wherein the light recycling element is a light splitter for allowing the first converted light beam and the second converted light beam to pass through and reflecting the unconverted light beam.

8. The illumination system as claimed in claim 7, further comprising a filter color wheel and a light guide element, wherein
the filter color wheel and the light source module are disposed on two opposite sides of the illumination system, and the filter color wheel has an excitation light penetration region and at least one non-excitation light penetration region, wherein the at least one non-excitation light penetration region is configured to reflect the excitation light beam; and
the light guide element comprises a penetration region and a dichroic region, the excitation light beam is reflected to the filter color wheel by the dichroic region of the light guide element, and the penetration region of the light guide element is configured to allow the excitation light beam from the filter color wheel to pass through.

9. The illumination system as claimed in claim 1, wherein the light recycling element is disposed between the phosphor wheel and the light uniformizing element.

10. The illumination system as claimed in claim 1, wherein at the second timing, a ratio between the excitation light beam and the first converted light beam converted from the excitation light beam is greater than 70%.

11. A projection apparatus, comprising an illumination system, a light valve, and a projection lens, wherein the illumination system is configured to provide an illumination light beam, the light valve is disposed on a transmission path of the illumination light beam to convert the illumination light beam into an image light beam, and the projection lens is disposed on a transmission path of the image light beam to project the image light beam out of the projection apparatus; and the illumination system comprises a light source module, a phosphor wheel, a light recycling element, and a light uniformizing element, wherein:
the light source module is configured to emit an excitation light beam;
the phosphor wheel comprises a phosphor region;
at a first timing, the excitation light beam is transmitted to the light uniformizing element, so that the illumination system outputs first light in the illumination light beam;
at a second timing, the excitation light beam is transmitted to the phosphor region of the phosphor wheel, so that a part of the excitation light beam transmitted to the phosphor region is converted into a first converted light beam, and the other part of the excitation light beam transmitted to the phosphor region forms an unconverted light beam and is transmitted to the light recycling element, and is reflected by the light recycling element to form a recycled light beam, the recycled light beam is transmitted to the phosphor region of the phosphor wheel, and a part of the recycled light beam is converted into a second converted light beam, wherein the first converted light beam and the second converted light beam are transmitted to the light uniformizing element through a same path, so that the illumination system outputs second light in the illumination light beam; and at the second timing, reflectivity of the light recycling element to a waveband of the excitation light beam is greater than 90%.

12. The projection apparatus as claimed in claim 11, wherein the phosphor wheel further comprises a non-phosphor region, at the first timing, the excitation light beam is transmitted to the non-phosphor region of the phosphor wheel, and the excitation light beam is reflected by the non-phosphor region, and is transmitted to the light uniformizing element.

13. The projection apparatus as claimed in claim 11, wherein at the first timing, the excitation light beam does not pass through the phosphor wheel and the light recycling element.

14. The projection apparatus as claimed in claim 11, wherein the phosphor wheel further comprises a non-phosphor region, and the light recycling element comprises a penetration region and a light splitting region, wherein a central angle of the penetration region of the light recycling element is equal to a central angle of the non-phosphor region of the phosphor wheel, and reflectivity of the light splitting region of the light recycling element to the waveband of the excitation light beam is greater than 90%;
at the first timing, the excitation light beam is sequentially transmitted to the non-phosphor region and the penetration region of the light recycling element; and
at the second timing, the unconverted light beam and the first converted light beam are transmitted to the light splitting region of the light recycling element.

15. The projection apparatus as claimed in claim 14, further comprising:
a filter color wheel, disposed between the light recycling element and the light uniformizing element, and having an excitation light penetration region and at least one non-excitation light penetration region, wherein a central angle of the excitation light penetration region of the filter color wheel is the same as a central angle of the penetration region of the light recycling element, and a sum of central angles of the at least one non-excitation light penetration region of the filter color wheel is the same as a central angle of the light splitting region of the light recycling element;
at the first timing, the excitation light beam is transmitted to the excitation light penetration region of the filter color wheel; and
at the second timing, the first converted light beam is transmitted to the at least one non-excitation light penetration region of the filter color wheel.

16. The projection apparatus as claimed in claim 11, wherein the light recycling element is a mirror and is not disposed on a transmission path of the first converted light beam, and the illumination system further comprises:
a filter color wheel, wherein the filter color wheel and the phosphor wheel are disposed on two opposite sides of the illumination system, and the filter color wheel has an excitation light penetration region and at least one non-excitation light penetration region;
at the first timing, the excitation light beam is transmitted to the excitation light penetration region of the filter color wheel; and
at the second timing, the excitation light beam is transmitted to the at least one non-excitation light penetration region of the filter color wheel and is reflected to the phosphor region of the phosphor wheel, and the first converted light beam and the second converted light beam are transmitted to the at least one non-excitation light penetration region of the filter color wheel and are transmitted to the light uniformizing element.

17. The projection apparatus as claimed in claim 11, wherein the light recycling element is a light splitter for allowing the first converted light beam and the second converted light beam to pass through and reflecting the unconverted light beam.

18. The projection apparatus as claimed in claim 17, further comprising a filter color wheel and a light guide element, wherein
- the filter color wheel and the light source module are disposed on two opposite sides of the illumination system, and the filter color wheel has an excitation light penetration region and at least one non-excitation light penetration region, wherein the at least one non-excitation light penetration region is configured to reflect the excitation light beam; and
- the light guide element comprises a penetration region and a dichroic region, the excitation light beam is reflected to the filter color wheel by the dichroic region of the light guide element, and the penetration region of the light guide element is configured to allow the excitation light beam from the filter color wheel to pass through.

19. The projection apparatus as claimed in claim 11, wherein the light recycling element is disposed between the phosphor wheel and the light uniformizing element.

20. The projection apparatus as claimed in claim 11, wherein at the second timing, a ratio between the excitation light beam and the first converted light beam converted from the excitation light beam is greater than 70%.

* * * * *